(12) United States Patent
Spann

(10) Patent No.: US 6,915,209 B1
(45) Date of Patent: Jul. 5, 2005

(54) VISUAL AND AUDIBLE BUS ROUTING SYSTEM

(76) Inventor: David I. Spann, 759 E. Gwinnett St., Savannah, GA (US) 31401

( * ) Notice: Subject to any disclaimer, the term of this patent is extended or adjusted under 35 U.S.C. 154(b) by 0 days.

(21) Appl. No.: 10/440,978

(22) Filed: May 19, 2003

(51) Int. Cl.[7] .......................... B60Q 1/00; G08G 7/123; G08B 7/00
(52) U.S. Cl. ...................... 701/213; 701/117; 340/472
(58) Field of Search ............................... 701/117, 213; 340/691.6, 425.5, 463, 464, 468, 472, 433, 460, 692

(56) References Cited

U.S. PATENT DOCUMENTS

| | | | | |
|---|---|---|---|---|
| 4,799,162 A | * | 1/1989 | Shinkawa et al. .......... 701/117 |
| 5,132,666 A | * | 7/1992 | Fahs .......................... 340/468 |
| 5,218,629 A | | 6/1993 | Dumond, Jr. et al. ......... 379/59 |
| D360,206 S | | 7/1995 | Williams ................... D14/157 |
| 5,467,071 A | * | 11/1995 | Koenig ....................... 340/433 |
| 5,483,454 A | | 1/1996 | Lewiner et al. ............. 364/443 |
| 5,963,151 A | | 10/1999 | Hubbard ..................... 340/996 |
| 6,006,159 A | | 12/1999 | Schmier et al. ............. 701/200 |
| 6,060,993 A | * | 5/2000 | Cohen ....................... 340/691.6 |
| 6,253,148 B1 | | 6/2001 | Decaux et al. ............. 701/204 |
| 6,701,143 B1 | * | 3/2004 | Dukach et al. ........... 455/414.2 |
| 2002/0118103 A1 | * | 8/2002 | Tabe .......................... 340/436 |

* cited by examiner

*Primary Examiner*—Thomas G. Black
*Assistant Examiner*—Dalena Tran

(57) ABSTRACT

A visual and audible bus routing system for providing hearing and visually impaired riders to automatically receive the information they need for arriving at their intended destinations. The visual and audible bus routing system includes a bus having windows, side and front walls and a front windshield; and also included an information processing assembly including a microprocessor being disposed in the bus, and also including display screens being securely and conventionally attached to the side and front walls of the bus for a visual display of route information including location of the bus; and further includes speakers being disposed internally and externally of the bus for providing audible messages of route information including location of the bus.

5 Claims, 3 Drawing Sheets

VISUAL AND AUDIBLE BUS ROUTING SYSTEM

BACKGROUND OF THE INVENTION

1. Field of the Invention

The present invention relates to bus routing systems and more particularly pertains to a new visual and audible bus routing system for providing hearing and visually impaired riders to automatically receive the information they need for arriving at their intended destinations.

2. Description of the Prior Art

The use of bus routing systems is known in the prior art. More specifically, bus routing systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,253,148; U.S. Pat, No. 6,006,159; U.S. Pat. No. 5,963,151; U.S. Pat. No. 5,483,454; U.S. Pat. No. 5,218,629; and U.S. Pat. No. Des. 360,206.

While these devices fulfill their respective, particular objectives and requirements, the aforementioned patents do not disclose a new visual and audible bus routing system. The prior art includes different forms of information systems for informing users of a public transport system.

SUMMARY OF THE INVENTION

The general purpose of the present invention, which will be described subsequently in greater detail, is to provide a new visual and audible bus routing system which has many of the advantages of the bus routing systems mentioned heretofore and many novel features that result in a new visual and audible bus routing system which is not anticipated, rendered obvious, suggested, or even implied by any of the prior art bus routing systems, either alone or in any combination thereof. The present invention includes a bus having windows, side and front walls and a front windshield; and also included an information processing assembly including a microprocessor being disposed in the bus, and also including display screens being securely and conventionally attached to the side and front walls of the bus for a visual display of route information including location of the bus; and further includes speakers being disposed internally and externally of the bus for providing audible messages of route information including location of the bus. None of the prior art includes the combination of the elements of the present invention.

There has thus been outlined, rather broadly, the more important features of the visual and audible bus routing system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new visual and audible bus routing system which has many of the advantages of the bus routing systems mentioned heretofore and many novel features that result in a new visual and audible bus routing system which is not anticipated, rendered obvious, suggested, or even implied by any of the prior art bus routing systems, either alone or in any combination thereof.

Still another object of the present invention is to provide a new visual and audible bus routing system for providing hearing and visually impaired riders to automatically receive the information they need for arriving at their intended destinations.

Still yet another object of the present invention is to provide a new visual and audible bus routing system that has a computerized mapping system that would know the current location of the bus at all times and a simplified map of the bus position along the travel route could also be readily displayed.

Even still another object of the present invention is to provide a new visual and audible bus routing system that would allow public transit riders to relax when traveling because they would be confident of being alerted to each bus stop arrival with both the display screens and audible announcement system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
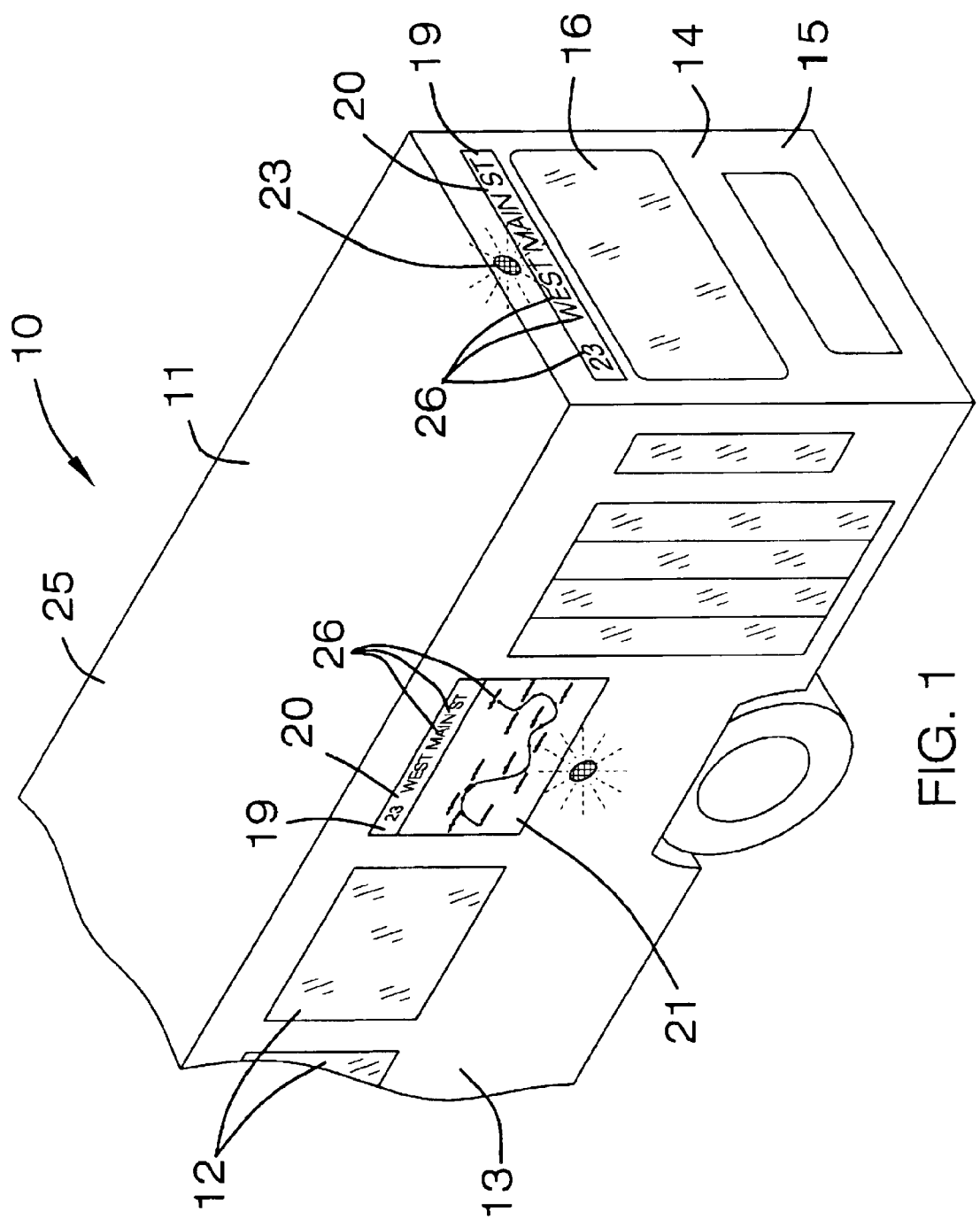
FIG. 1 is a front elevational view of a new visual and audible bus routing system according to the present invention.
Figure 2:
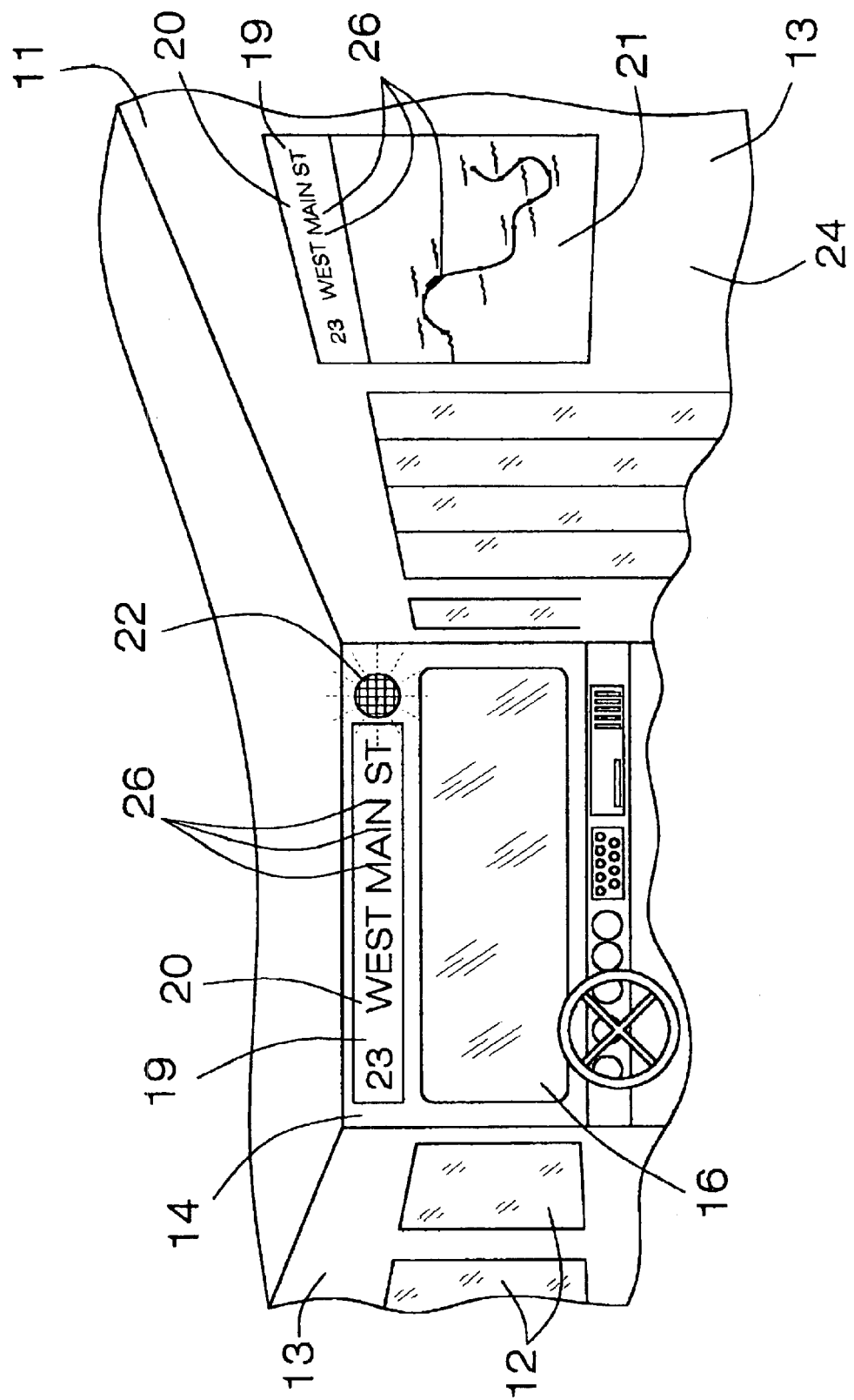
FIG. 2 is a partial perspective view of the interior of the bus of the present invention.
Figure 3:
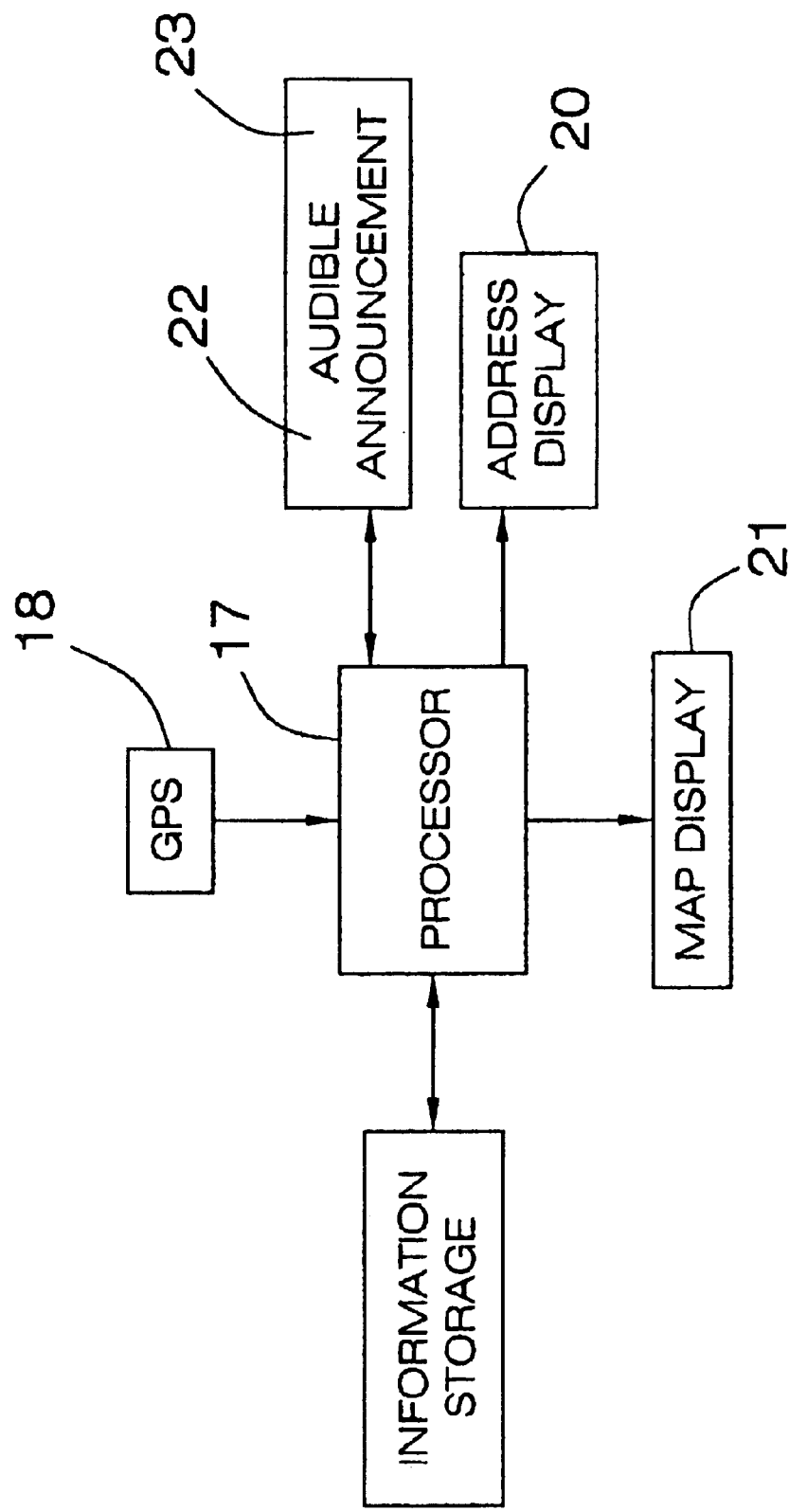
FIG. 3 is a schematic diagram view of the present invention.

With reference now to the drawings, and in particular to FIGS. 1 through 3 thereof, a new visual and audible bus routing system embodying the principles and concepts of the present invention and generally designated by the reference numeral 10 will be described.

As best illustrated in FIGS. 1 through 3, the visual and audible bus routing system 10 generally comprises a bus 11 having windows 12, side and front walls 13, 14 and a front windshield 16.

The information processing assembly includes a microprocessor 17 being conventionally disposed in the bus II, and also includes display screens 19 being securely and conventionally attached to the side and front walls 13, 14 of the bus 11 for a visual display of route information including location of the bus 11. The information processing assembly further includes a global positioning system 18 being conventionally connected to the microprocessor 17 for providing present information concerning location of the bus 11 on a designated route for the bus 11. The display screens 19 include a digital display screen 20 being securely and conventionally attached to an outer side 15 of the front wall 14 above the windshield 16 of the bus 11 for digitally displaying the route of the bus 11. The digital display screen 20 has light-emitting diodes 26 being conventionally disposed therein. The display screens 19 also include a map display screen 21 being securely and conventionally attached to one of the side walls 13 of the bus 11 for displaying a map of the route being taken by the bus 11. The map display screen 21 has light-emitting diodes 26 disposed therein.

Speakers 22, 23 are conventionally disposed internally 24 and externally 25 of the bus 11 for providing audible messages of route information including location of the bus 11. The speakers 22, 23 include a first speaker 22 being conventionally disposed inside 24 the bus 11, and also include a second speaker 23 being conventionally disposed externally 25 of the bus 11 for providing audible messages concerning route information and location of the bus 11.

In use, the method of providing a visual and audible bus routing system 10 includes three main steps. The first step includes the microprocessor 17 receiving constant updated information as to the current location of the bus 11 on its designated route from the global positioning system 18. The second step would be to display the constant updated information by the microprocessor 17 upon the display screens displaying maps 21 of the route of the bus 11 by creating a map 21 of the route of the bus 11 upon the display screens 21 and providing a blinking lightemitting member 26 upon the map 21 indicating present location of the bus 11 along the route of the bus 11. The third step is to provide audible messages. of the information from the microprocessor 17 through the speakers 22,23 for visually impaired riders of the bus 11 to accurately know the route information of the bus 11. To enable this, there is a sound chip identifying selected locations on the bus 11 route that is automatically activated by the microprocessor 17 upon reaching the selected locations as identified by the global positioning system 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the visual and audible bus routing system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A visual and audible bus routing system comprising:
   a bus having windows, side and front wall,; and a front windshield;
   an information processing assembly including a microprocessor being disposed in said bus, and also including display screens being attached to said side and front walls of said bus for a visual display of route information including location of said bus, said information processing assembly further including a global positioning system being connected to said microprocessor for providing present information concerning location of said bus on a designated route for said bus, said display screens including a digital display screen being attached to an outer side of said front wall above said windshield of said bus for digitally displaying the route of said bus, said digital display screen having light-emitting diodes disposed therein, said display screens also including a map display screen being attached to one of said side walls of said bus for displaying a map of the route being taken by said bus, said map display screen having light-emitting diodes disposed therein; and
   speakers being disposed internally and externally of said bus for providing audible messages of route information including location of said bus.

2. The visual and audible bus routing system as described in claim 1, wherein said speakers include a first speaker being disposed inside said bus, and also include a second speaker being disposed externally of said bus for providing audible messages concerning route information and location of said bus.

3. A method of providing u visual and audible bus routing system includes the steps of:
   providing a bus having windows, side and front walls and a front windshield, and also providing a microprocessor being disposed in said bus and display screens being attached to said side and front walls of said bus for a visual display of route information including current location of said bus, and further providing speakers being disposed internally and externally of said bus for providing audible messages of route information including location of said bus;
   receiving constant updated information as to current location of said bus on its designated route by said microprocessor from said global positioning system, and also including transmitting location of said bus from said global positioning system to said microprocessor;
   displaying said constant updated information by said microprocessor upon said display screens displaying maps of the route of said bus, the step of displaying said information also includes the step of and creating a map of the route of said bus upon said display screens and providing a blinking light-emitting member Upon said map indicating present location of said bus along the route of said bus; and
   providing audible messages of said information from said microprocessor through said speakers for visually impaired riders of said bus to accurately know the route information of said bus.

4. The method of providing a visual and audible bus routing system as described in claim 3, wherein the step of providing audible messages also includes the step of providing a sound chip identifying selected locations on said bus route.

5. The method of providing a visual and audible bus routing system as described in claim 4, wherein the step of providing a sound chip further includes the step of said sound chip being automatically activated by said microprocessor upon reaching said selected locations as identified by said global positioning system.

* * * * *